April 9, 1940.  J. W. LEIGHTON  2,196,702
RADIUS ROD
Filed Jan. 27, 1938
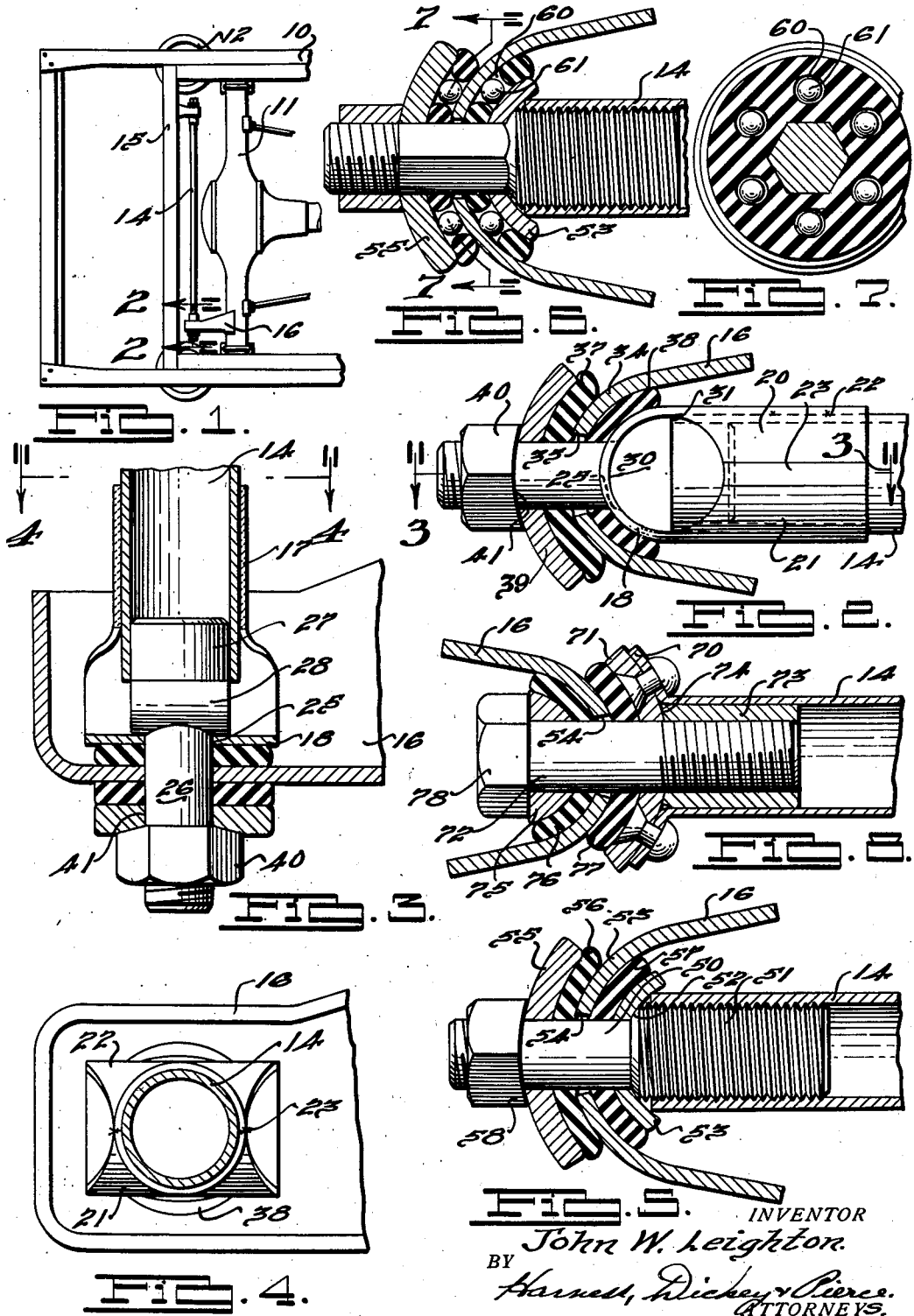
INVENTOR
John W. Leighton
BY
Harness, Dickey & Pierce
ATTORNEYS.

Patented Apr. 9, 1940

2,196,702

UNITED STATES PATENT OFFICE 2,196,702

RADIUS ROD

John W. Leighton, Port Huron, Mich.

Application January 27, 1938, Serial No. 187,254

3 Claims. (Cl. 287—85)

The invention relates generally to motor vehicles and it has particular relation to pivotal joints or connections.

In certain respects the invention is related to that disclosed in my copending application for patent on Universal connection, Serial No. 172,069, filed November 1, 1937.

One object of the invention is to provide an improved, simple, and inexpensive pivotal joint or connection which allows pivotal movement of the parts in different planes.

Another object of the invention is to provide an improved joint of this character which includes parts constructed of resilient rubber so as not only to provide resiliency in the connection, but also to prevent noise and render it unnecessary to provide lubrication.

Another object of the invention is to provide improvements in radius rods for motor vehicles wherein the pivotal connections are of the type indicated heretofore and wherein provision is made for adjustments.

Other objects of the invention will become apparent from the following specification, the drawing relating thereto, and from the claims hereinafter set forth.

For a better understanding of the invention, reference may be had to the drawing wherein:

Figure 1 is a fragmentary, elevational view, illustrating a motor vehicle chassis having a radius rod embodying one form of the invention;

Fig. 2 is a cross-sectional view on a larger scale taken substantially along the line 2—2 of Fig. 1;

Fig. 3 is a cross-sectional view taken substantially along the line 3—3 of Fig. 2;

Fig. 4 is a cross-sectional view taken substantially along the line 4—4 of Fig. 3;

Fig. 5 is a cross-sectional view illustrating a pivotal connection constructed according to another form of the invention;

Fig. 6 is a cross-sectional view illustrating a pivotal joint constructed according to another form of the invention;

Fig. 7 is a cross-sectional view taken substantially along the line 7—7 of Fig. 6; and Fig. 8 is a cross-sectional view illustrating a pivotal joint constructed according to another form of the invention.

Referring to Fig. 1, the frame of the vehicle is indicated at 10, the rear axle housing at 11, and coil springs operatively between the axle housing and frame are indicated generally at 12. In using a coil spring suspension of this type, some means must be employed for preventing undesirable sidewise movement of the frame with respect to the axle housing, and while pivotal joints constructed according to the present invention may have a more general application, they are particularly illustrated in conjunction with radius rods for preventing such relative sidewise movement of the frame and the axle housing. In Fig. 1, the radius rod is indicated at 14 and at one end it is connected to a cross-frame member 15 while at its other end it is connected to a bracket 16 which may be welded to the axle housing.

Now referring more particularly to Figs. 2, 3, and 4, it will be noted that the radius rod 14 is of tubular character and that it projects at its end into a member 17, which beyond the end of the rod is shaped, as indicated at 18, to provide a substantially semi-cylindrical strap portion disposed transversely to the axis of the rod. This member 17 may be formed from a piece of sheet metal which is bent to provide the semi-cylindrical portion 18 and also to provide semi-cylindrical side portions 20 and 21 that embrace the sides of the rod 14. Once the parts of the joints are assembled, the side portions 20 and 21 may be welded to the rod at different points, indicated at 22, for example, and the adjoining edges of the two portions 20 and 21 may be welded together and also to the rod, as indicated at 23.

Substantially at its center, the semi-cylindrical strap portion 18 has an opening 25 that receives a bolt 26 and this bolt at its inner end has a cylindrical stub or head portion 27 which projects into the end of the rod 14. Beyond the end of the rod, the head on the bolt has a portion 28 which, as shown by Fig. 2, is substantially semi-cylindrical in shape, as indicated at 30, and which fits the inner surface of the strap portion 18. It will be noted that this semi-cylindrical portion 30 of the bolt head abuts the end face of the rod 14, as indicated at 31. From this description, it will be appreciated that the bolt and rod 14 are quite positively connected and that the connection is such as to take or impart thrust, tension, and torque forces.

The bracket 16 is generally of U shape in cross-section, as shown by Fig. 2, and has a bent cylindrical base portion 34 which generally is concentric to the semi-cylindrical strap portion 18. The rod 14 projects into the channel of the bracket 16 from the open side thereof and the shank of the bolt projects through an enlarged opening 35 in the base portion 34 of the channel, and it will be noted that the side of the opening 35 is generally conical so as to permit a substantially wide range of pivotal movement of the bolt with respect to the bracket. On opposite sides of the base portion 34 of the bracket, rubber discs 37 and 38 are provided and these are centrally apertured to receive the shank of the bolt, and it will be noted that these openings in the rubber discs are substantially the same size as the shank. Outwardly of the rubber disc 37, a bent cylindrical metal disc 39 is provided on the bolt and beyond this disc the bolt is threaded and has a nut 40 for drawing the parts into tight relation. Attention is directed to the fact that the inner face of the nut 40 has a cylindrical surface 41 and it will be appreciated that the rubber allows turning this nut sufficiently to obtain the desired tightness and yet when the cylindrical surface on the nut coincides with the outer surface of the metal disc 39 with the parts in tight relation, the resiliency of the rubber will positively hold the surfaces on the nut and metal disc in contacting relation and prevent loosening of the nut.

The opposite end of the radius rod 14 may be connected to the cross frame member 15 by a similar arrangement, as will be readily understood. The arrangement thus provided will efficiently take sidewise thrust forces and turning forces which necessarily will occur during up and down relative movement of the frame and axle. During any such relative vertical movement, the rod, bolt, and rubber discs will turn relative to the brackets on the frame and axle housing and such turning movement will be accommodated through torsioning of the rubber. Sidewise thrust movements are taken through the rubber discs and while there is some resiliency in this action, it is limited, as will be clearly recognized. While sidewise and up and down tilting of the rod alone have been mentioned particularly, it of course will be understood that many other movements will occur and that ordinarily action of each pivotal joint will involve a combination of different movements. For example, the frame may move upwardly and longitudinally at the same time and hence the rod 14 will not only tilt vertically but also angle longitudinally. The opening 35 in the bracket permits movement in all directions and any longitudinal angling of the rod will be permitted by the resiliency of the rubber.

Referring to Fig. 5, the type of joint shown by this figure is of frusto-spherical character. The rod 14 in this case is internally threaded at its end and the bolt of the connection, indicated at 50, has a threaded head 51 engaging the threaded end of the rod. The shoulder at the junction of the threaded head 51 and the shank of the bolt is of spherical shape or generally conical, as indicated at 52, and engages a frusto-spherical washer or disc 53 having an opening at its center closely fitting the shank of the bolt. A nut 58 on the threaded end of the bolt has its inner surface substantially of frusto-spherical character so that it will fit the outer surface of disc 55. If desired, a cotter pin may be employed on the end of the bolt for positively preventing loosening of the nut. Generally the connection thus provided will function in the same capacity as that previously described with the exception that pivotal movement in any direction will cause turning of the connected parts along spherically arranged rubber and metal surfaces. Such pivotal movements in any plane will be accommodated by torsioning of the rubber along the spherical surfaces.

Adjustment of the length of the radius rod may be effected by means of the threaded engagement of the bolt with the end of the tie rod, although if adjustment is not deemed necessary, the tie rod may be welded to the bolt or to the metal disc 53.

The construction shown by Fig. 6 is substantially like that shown by Fig. 5 with the exception that the rubber discs are provided with openings 60, at circumferentially spaced points and ball bearings 61 are disposed in these openings. These ball bearings are adapted to have bearing contact with the metal surfaces and such surfaces, accordingly, may be hardened and coined so as to provide a proper metal bearing surface. It will be apparent that the parts may be so brought together by tightening the nut on the bolt that the balls would take substantially all the bearing loads or that part of the load can be taken by the rubber. In other words, the rubber could take the lighter loads and then upon sufficient compression of the rubber, the balls would take a part of the load. It will be noted in this case that the shank of the bolt is hexagonal in shape and the openings in the metal discs 53 and 55 similarly are of hexagonal shape, so that these discs will be turned positively with the bolt, although ordinarily this will occur as in the constructions previously described.

Fig. 8 provides an arrangement of frusto-spherical surfaces also, but in this case the rod 14 has a flange at its outer end, indicated at 70, and this flange is riveted to a heavier metal disc 71. A bolt 72 is provided which is threaded at its inner end into a sleeve 73 disposed in the end of the rod 14 and this sleeve may be welded to the disc 71, as indicated at 74. Beyond the end of the tie rod, the bolt passes through a central opening in the bracket 16, indicated by the numeral 54, and within the bracket, the bolt has a washer 75 thereon which has a frusto-spherical surface. Between the disc 71 and the washer 75, and on opposite sides of the bracket 16, rubber discs 76 and 77 are provided and these closely fit the shank of the bolt. The outer end of the bolt has an integral head 78 and it will be apparent that the parts are assembled by the turning of the bolt until it is sufficiently threaded into the sleeve 73. If desired, the sleeve 73 and disc 71 may be welded to the bolt if the parts are in proper relation. This may be accomplished by a projection weld generally at the point indicated previously at 74.

While different forms of the invention have been illustrated and described, it will be appreciated that pivotal joints have been provided which will permit pivotal movement of the parts connected in practically all planes. It is moreover evident that all movement is affected by the rubber and thus the movement is not only cushioned but rendered silent. Again it is clear that the parts may be manufactured very inexpensively and that assembly thereof is simple.

Although more than one form of the invention has been illustrated and described in detail, it will be apparent to those skilled in the art that various modifications may be made without departing from the scope of the appended claims.

What is claimed is:

1. A pivotal connection for automobiles comprising a radius or like rod having an internally threaded tubular end portion, a bolt having an end threaded into such end portion, a curved plate member having an opening receiving the bolt beyond the end of said tubular portion, similarly curved means on the bolt at opposite sides of the plate member and engaging the curved surfaces of the latter so as to provide a pivotal support for such member, and means on the outer end of the bolt for holding the curved parts in contacting relation.

2. A pivotal connection for automobiles comprising a radius or like rod having an internally threaded tubular end portion, a bolt having an end threaded into such end portion, a curved plate member having an opening receiving the bolt beyond the end of said tubular portion, similarly curved and apertured plate elements on the bolt at opposite sides of the plate member, curved discs of rubber between the plate elements and the plate member, and means on the outer end of the bolt for holding the curved parts in contacting relation.

3. A pivotal connection for automobiles comprising a radius or like rod having an internally threaded tubular portion, a bolt having an enlarged threaded end which is threaded into such tubular end portion, a curved plate member having an enlarged opening receiving the bolt beyond the end of said tubular portion, similarly curved plate members on the bolt at opposite sides of the first plate member and having openings substantially fitting the bolt, a resilient element on the bolt between the first plate member and each of the second mentioned curved plate members and substantially fitting the bolt, and means on the outer end of the bolt for holding the parts in contacting relation.

JOHN W. LEIGHTON.